(12) United States Patent
Sauerstein et al.

(10) Patent No.: US 10,494,990 B2
(45) Date of Patent: Dec. 3, 2019

(54) EXHAUST GAS TURBOCHARGER

(71) Applicant: BorgWarner Inc., Auburn Hills, MI (US)

(72) Inventors: Rolf Sauerstein, Finkenbach-Gersweiler (DE); Philip Christoph Parma, Rheinboellen (DE); Sean Rylance, Barnsley (GB); Andrew Day, Huddersfield (GB)

(73) Assignee: BorgWarner Inc., Auburn Hills, MI (US)

( * ) Notice: Subject to any disclaimer, the term of this patent is extended or adjusted under 35 U.S.C. 154(b) by 196 days.

(21) Appl. No.: 15/548,031

(22) PCT Filed: Feb. 2, 2016

(86) PCT No.: PCT/US2016/016042
§ 371 (c)(1),
(2) Date: Aug. 1, 2017

(87) PCT Pub. No.: WO2016/126623
PCT Pub. Date: Aug. 11, 2016

(65) Prior Publication Data
US 2018/0023459 A1    Jan. 25, 2018

(30) Foreign Application Priority Data
Feb. 3, 2015    (DE) .................... 10 2015 201 805

(51) Int. Cl.
*F01D 25/08* (2006.01)
*F02B 37/18* (2006.01)
(Continued)

(52) U.S. Cl.
CPC .............. *F02B 37/18* (2013.01); *F01D 25/08* (2013.01); *F01D 17/105* (2013.01); *F01D 25/24* (2013.01); *F05D 2220/40* (2013.01)

(58) Field of Classification Search
None
See application file for complete search history.

(56) References Cited

U.S. PATENT DOCUMENTS 5,857,337 A     1/1999   Kawasaki
8,499,557 B2 *  8/2013   Grabowska ........... F01D 17/105
                                                     251/298
(Continued)

FOREIGN PATENT DOCUMENTS

DE       19708000 A1    9/1997
DE    102013006369 A1   10/2014
(Continued)

OTHER PUBLICATIONS

Written Opinion and International Search Report dated Apr. 25, 2015, in International Application No. PCT/US2016/016042.

*Primary Examiner* — Michael Lebentritt
(74) *Attorney, Agent, or Firm* — Eric L. Doyle; Stephan A. Pendorf; Patent Central LLC

(57) ABSTRACT

An exhaust gas turbocharger (1) including a compressor housing (2), a bearing housing (3), a turbine housing (4) in which a turbine wheel (5) is arranged, which has a housing inlet (6), which has a turbine spiral (7) connecting to the housing inlet (6), which has a housing outlet (8), and which has a wastegate arrangement (9), which in the open state brings the housing inlet (6) into flow connection with the housing outlet (8) for guiding a wastegate mass flow. The wastegate insert part (10) is arranged in the turbine housing (4) between the turbine wheel (5) and the housing outlet (8) and the open wastegate arrangement (9) introduces the wastegate mass flow into the wastegate insert arrangement (9).

14 Claims, 5 Drawing Sheets

Figure 1:
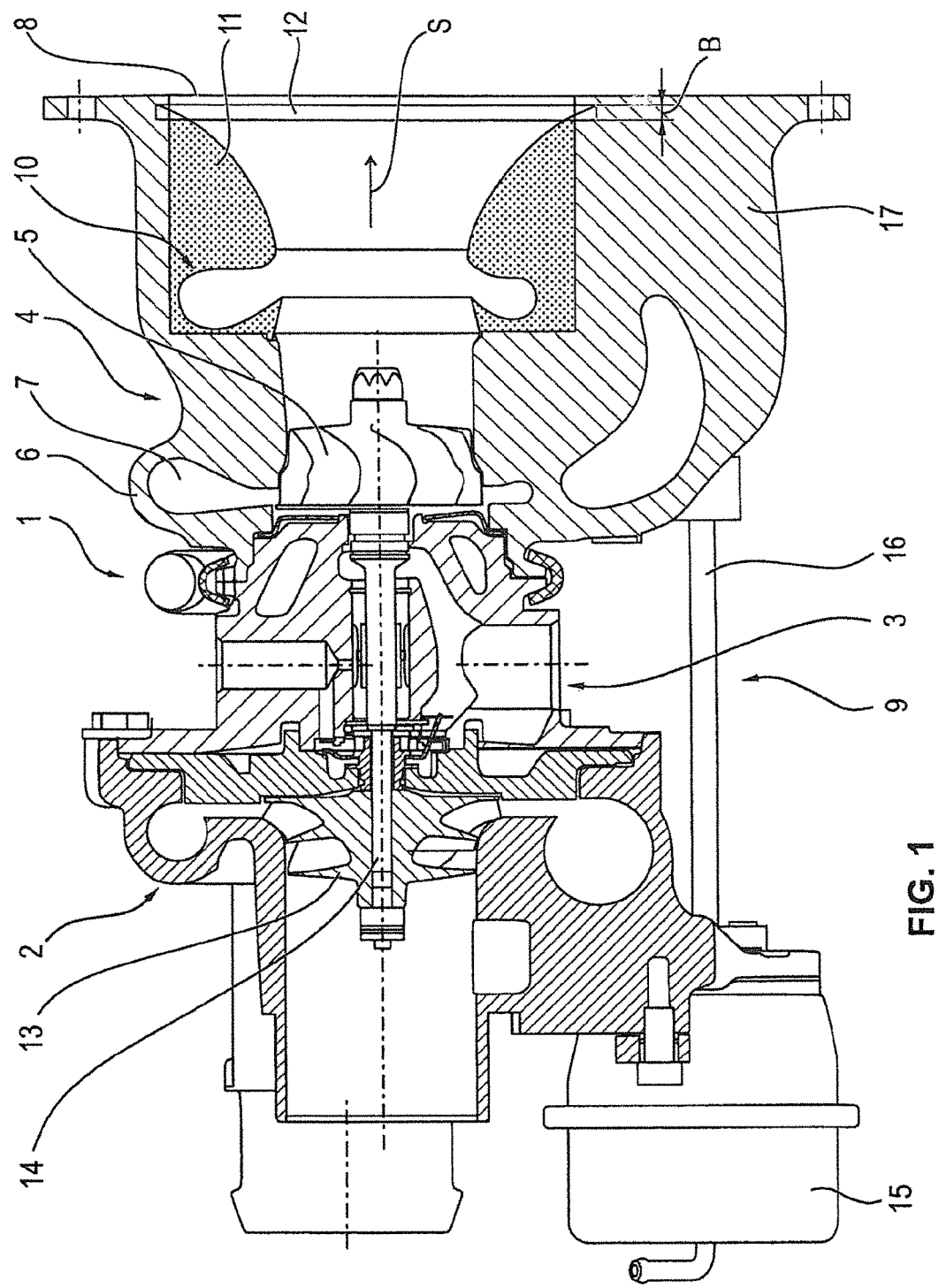

(51) Int. Cl.
*F01D 17/10* (2006.01)
*F01D 25/24* (2006.01)

(56) References Cited

U.S. PATENT DOCUMENTS

| | | | | |
|---|---|---|---|---|
| 10,215,088 B2* | 2/2019 | Kemona | ............... | F02B 37/186 |
| 2011/0268559 A1 | 11/2011 | Lombard et al. | | |
| 2012/0201655 A1* | 8/2012 | Kusakabe | ............... | F01D 9/026 |
| | | | | 415/116 |
| 2013/0291539 A1* | 11/2013 | Koch | ............... | F01D 17/24 |
| | | | | 60/602 |
| 2015/0147162 A1* | 5/2015 | Stilgenbauer | ......... | F01D 17/105 |
| | | | | 415/145 |
| 2015/0292395 A1* | 10/2015 | Dilalan | ............... | F16K 1/20 |
| | | | | 60/602 |
| 2015/0300244 A1* | 10/2015 | Stilgenbauer | ......... | F01D 17/105 |
| | | | | 415/145 |
| 2015/0377062 A1* | 12/2015 | Parma | ............... | F01D 25/168 |
| | | | | 417/53 |
| 2016/0024998 A1* | 1/2016 | Day | ............... | F02D 23/00 |
| | | | | 415/144 |
| 2016/0146098 A1* | 5/2016 | Dilalan | ............... | F02B 37/186 |
| | | | | 251/228 |
| 2016/0169090 A1* | 6/2016 | Murphy | ............... | F02B 37/183 |
| | | | | 415/144 |
| 2016/0245119 A1* | 8/2016 | Wilkins | ............... | F01D 25/24 |
| 2016/0298533 A1* | 10/2016 | Mawer | ............... | F02B 37/183 |
| 2017/0058762 A1* | 3/2017 | Marques | ............... | F02B 37/186 |
| 2017/0058909 A1* | 3/2017 | Barber | ............... | F04D 29/059 |
| 2017/0370278 A1* | 12/2017 | McGahey | ............... | F02B 37/025 |
| 2018/0045105 A1* | 2/2018 | Tomanec | ............... | F01D 17/105 |
| 2018/0193967 A1* | 7/2018 | Ruh | ............... | B23P 23/04 |
| 2018/0259088 A1* | 9/2018 | Yamanaka | ............... | F01D 17/16 |

FOREIGN PATENT DOCUMENTS

| | | |
|---|---|---|
| GB | 2312930 A | 11/1997 |
| JP | H07139364 A | 5/1995 |
| WO | 2011053513 A2 | 5/2011 |

\* cited by examiner

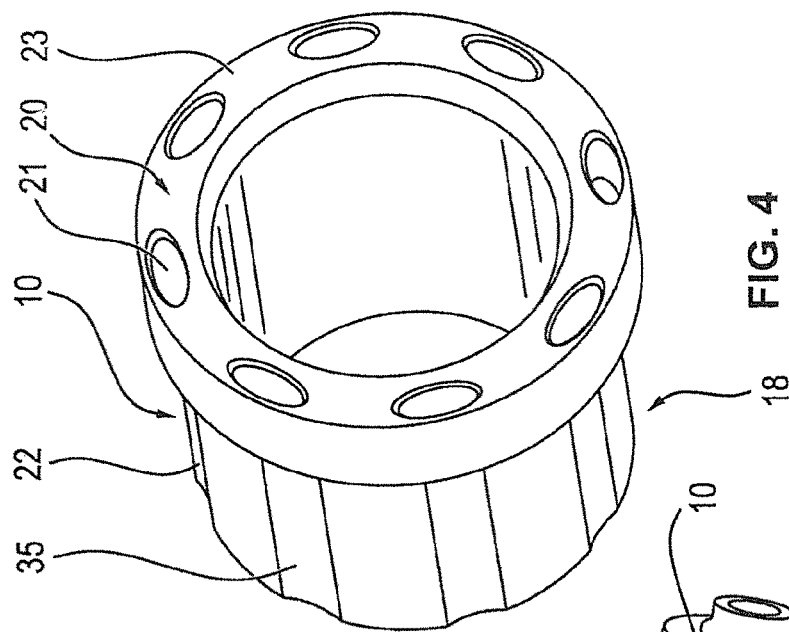
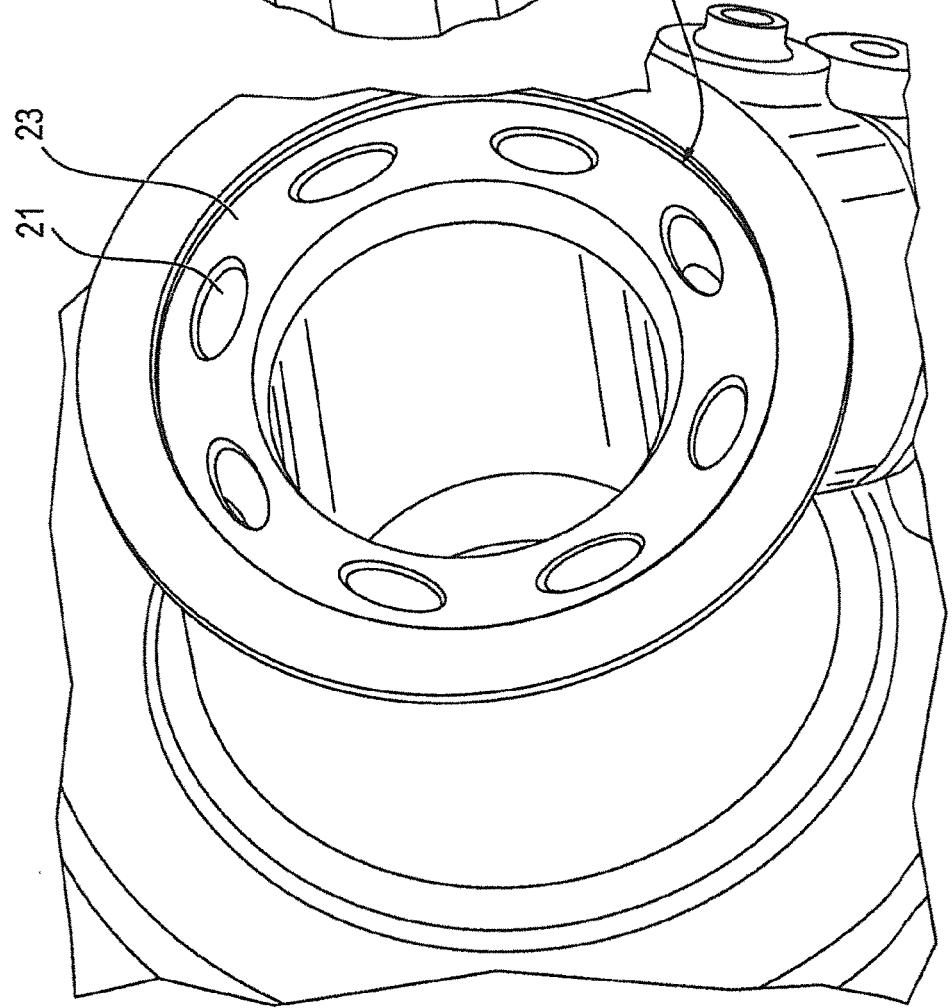

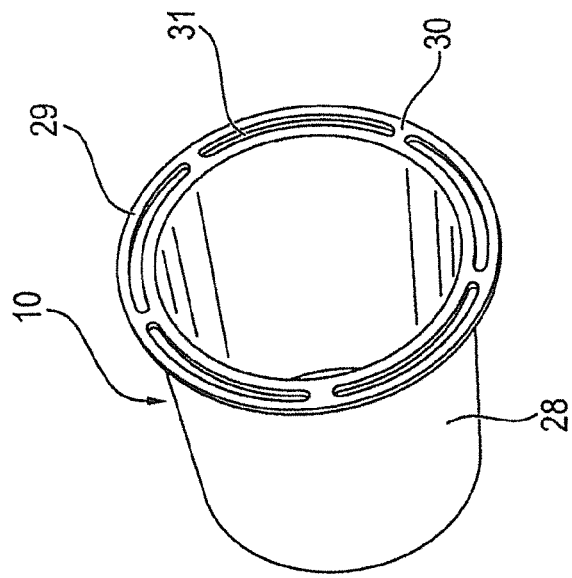
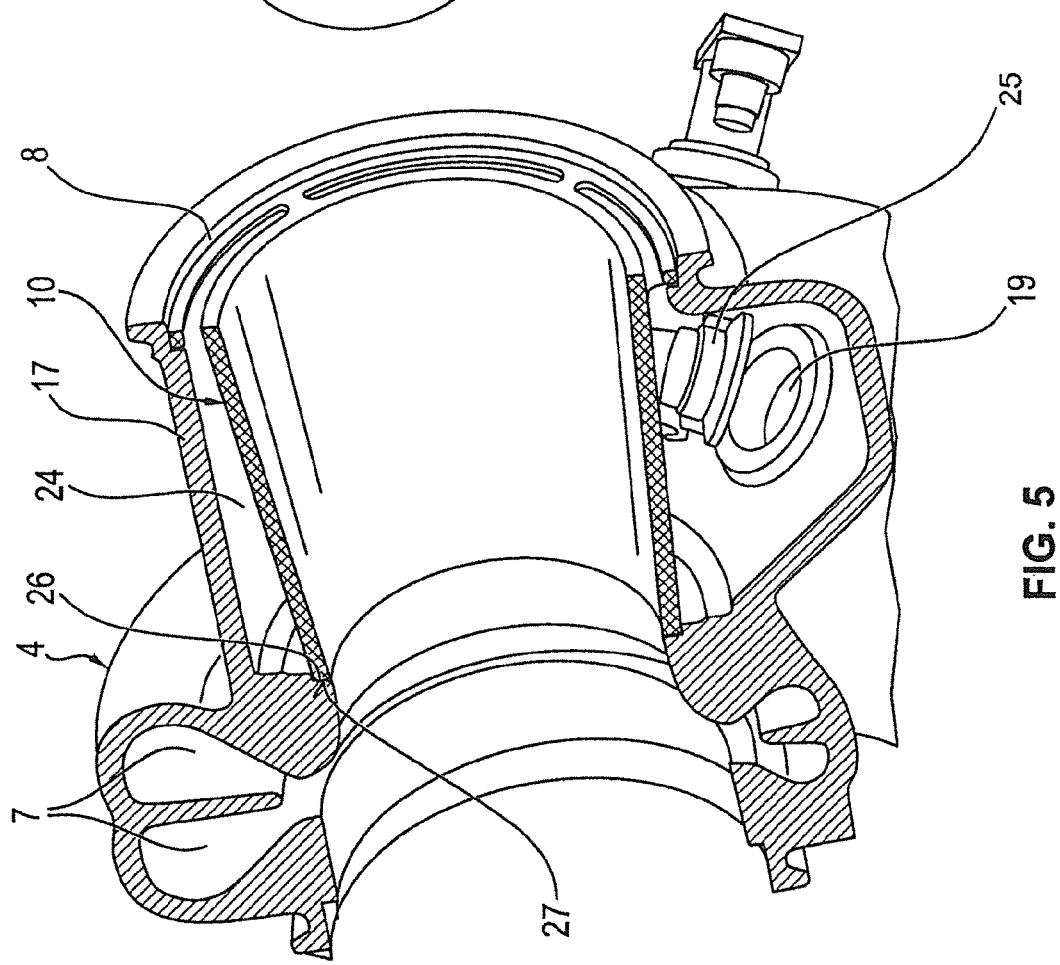
FIG. 6
FIG. 5

EXHAUST GAS TURBOCHARGER

The invention relates to an exhaust gas turbocharger according to the preamble to Claim 1.

An exhaust gas turbocharger of this type is known from DE 196 18 160 A1. This known exhaust gas turbocharger has a bypass which bypasses a turbine wheel and can be regulated by a controllable or regulatable wastegate valve of an adjustment device. Additional exhaust gas turbochargers are known from DE 197 08 000 A1 and U.S. Pat. No. 8,534,994 B2.

Within the scope of the invention, examinations carried out on these known exhaust gas turbochargers have demonstrated that the outflow behavior of the turbine is in need of improvement during normal operation with a closed wastegate, and a targeted injection of the mass flow is desirable with an open wastegate, in particular to improve the outflow from a downstream catalytic converter.

It is the object of the present invention to create an exhaust gas turbocharger of the type indicated in the preamble to Claim 1, with which it is possible to at least minimize the listed disadvantages of the prior art.

The solution to this problem is carried out by the features of Claim 1.

Accordingly, the exhaust gas turbocharger according to the invention has in particular, in addition to a compressor housing with a compressor wheel and a bearing housing for mounting a rotor shaft, a turbine housing in which a turbine wheel is arranged, the turbine wheel being fixed on an end of the rotor shaft diametrically opposite to the compressor wheel. The turbine housing comprises a housing inlet, in particular in the form of a housing inlet flange, to which a turbine spiral is connected. Exhaust gas flows via the housing inlet into the turbine spiral and drives the turbine wheel. This mass flow driving the turbine wheel exits axially from a housing outlet of the turbine housing.

Further, the turbine housing of the exhaust gas turbocharger according to the invention is provided with a wastegate arrangement having a wastegate flap which is actuatable by means of an actuation or adjustment device and which may open and close a bypass channel. When the bypass channel is open, the turbine housing inlet is fluidically connected to the turbine housing outlet in order to be able to guide at least a part of the mass flow flowing into the housing inlet of the turbine housing around the turbine wheel.

In order to improve the out flow behavior of the turbine during normal operation with a closed wastegate and to achieve a targeted injection of the mass flow with an open wastegate, in particular to improve a flow off from a catalytic converter, a wastegate insert part is arranged according to the invention in the turbine housing into which insert part the wastegate mass flow is introduced when the wastegate arrangement is open. The improvement of the flow off behavior and likewise a reduction of heat losses is hereby achieved in that, due to the wastegate insert part, the wastegate exhaust gas flow may be regulated with respect to the mixture point with the main turbine exhaust gas flow and with respect to the increased axial introduction of the wastegate exhaust gas flow. Thus, the insert part achieves an optimal diffusion of the flow in order to maximize output.

Further, the insert part defines the position of the turbine diffusor area and the geometry thereof. Finally, the provision of heat insulation surrounding the wastegate insert part results in the advantage of a reduction of heat losses.

The subclaims have advantageous refinements of the invention as their subject matter.

In order to achieve a simple producibility and mountability, it is possible in a particularly preferred embodiment to design the wastegate insert part as a separately producible component which is inserted into the turbine housing and fixed in the same.

This separately producible component may, in particular, be a sheet metal insert part. Other production possibilities are, however, likewise conceivable.

In order to keep production costs low, it is preferably possible to design the turbine housing as a cast housing into which the insert part may be inserted and in which the insert part may be fixed.

In another particularly preferred embodiment, an annular gap is provided downstream of the wastegate insert part in the turbine housing outlet or in the region of this outlet, when viewed in the flow direction of the introduced exhaust gases. During wastegate operation, thus when the bypass is open, the flow at the turbine housing inlet or at the turbine housing inlet flange is withdrawn, via a valve or a wastegate flap, from the main flow to the turbine wheel prior to entry into the turbine wheel spiral and is introduced through this annular gap (or through this nozzle) back into the main flow downstream of the turbine wheel via the wastegate insert part. In this embodiment, the angle of the inflow is preferably adjusted to the width of the annular gap and the spiral dimensions are adjusted to the maximum throughput of the wastegate arrangement.

In summary, it may be determined that by providing a wastegate insert part as a downstream component of the turbine spiral, a more advantageous embodiment of the turbine housing is possible. The previously mentioned provision of insulation or heat insulation around the wastegate insert part further results in the advantage of a faster catalytic converter response characteristic.

Figure 2:
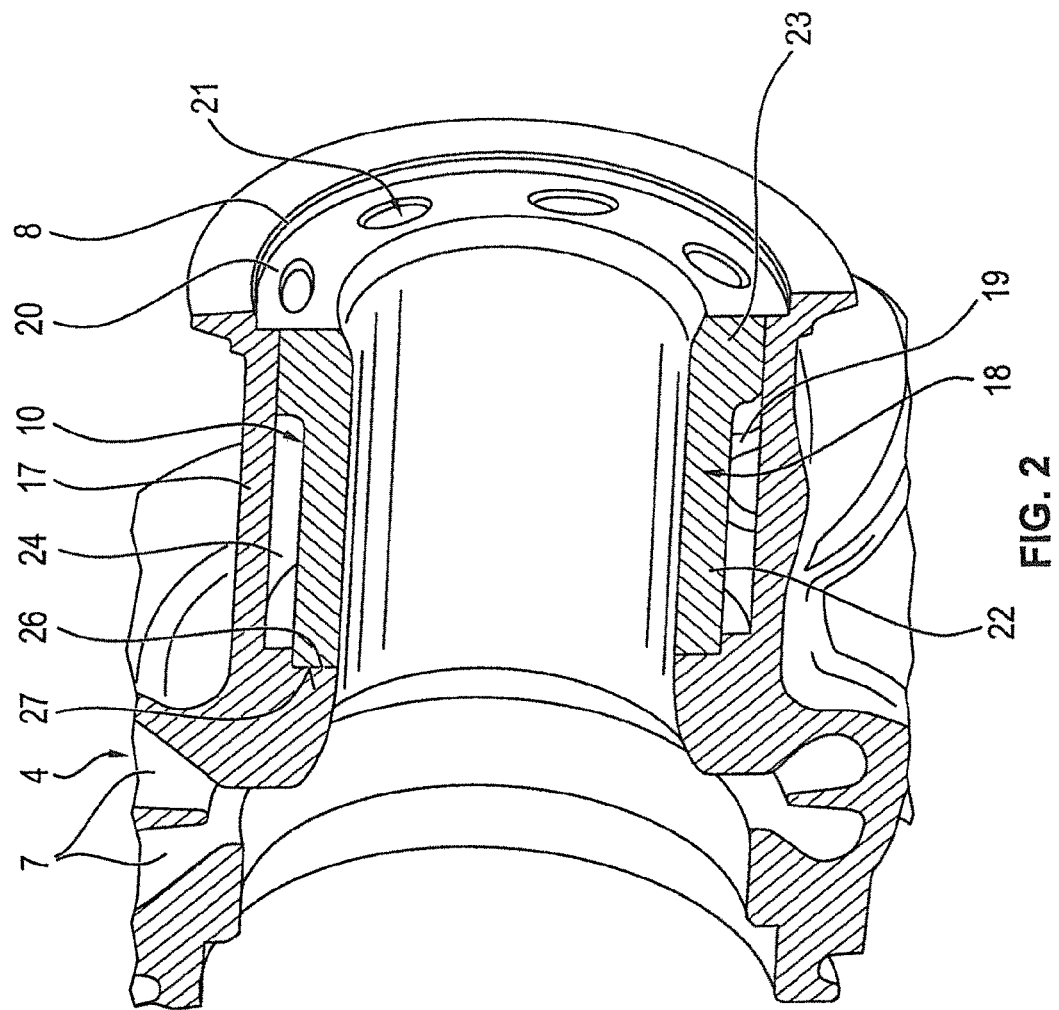
Figure 8:
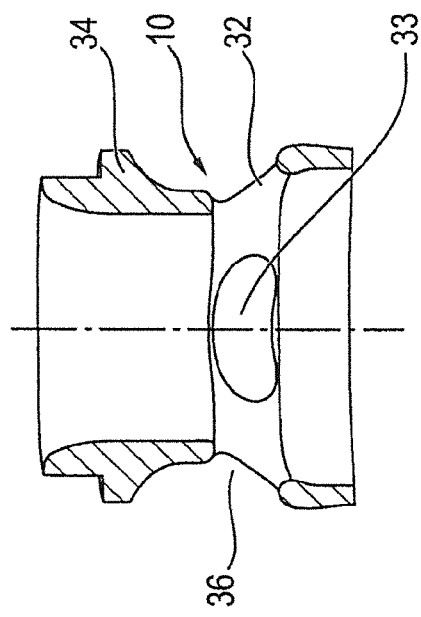
Figure 9:
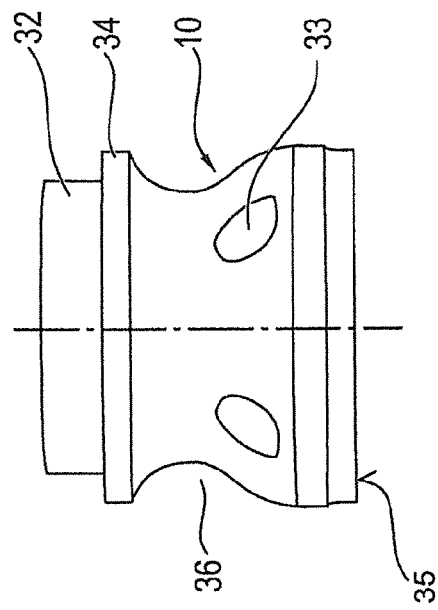
Figure 7:
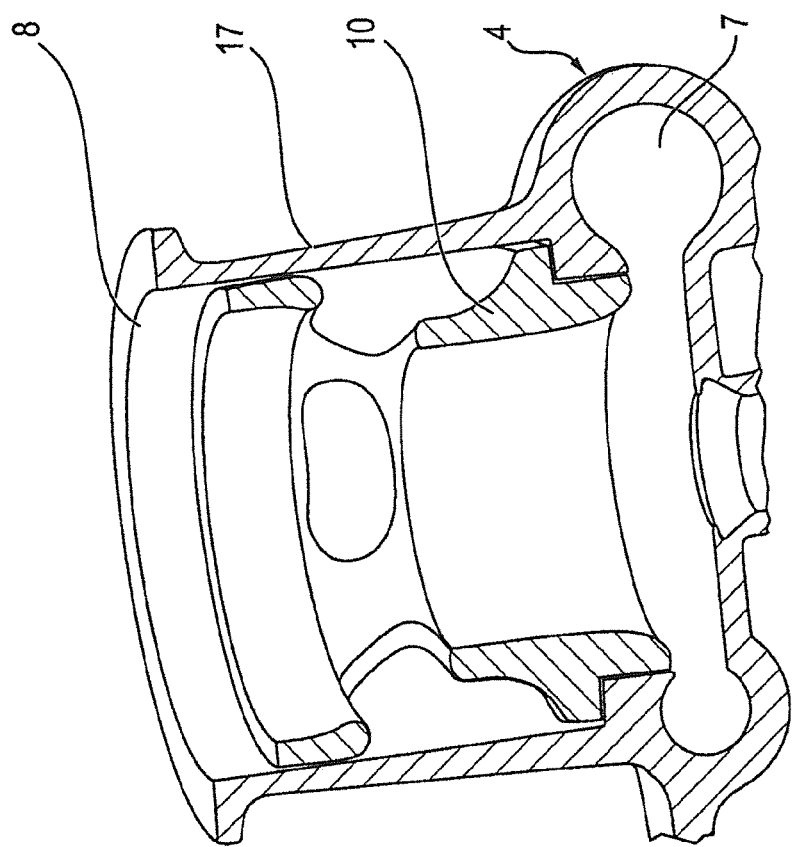

Additional details, features, and advantages of the invention arise from the subsequent description of an embodiment with reference to the drawings:

FIG. 1 shows a cross-sectional view of a first embodiment of an exhaust gas turbocharger according to the invention, FIG. 2 shows a perspective cross-sectional view of a second embodiment of the exhaust gas turbocharger according to the invention, FIG. 3 shows a front view of the exhaust gas turbocharger according to FIG. 2, FIG. 4 shows a perspective representation of an insert sleeve according to the embodiment from FIGS. 2 and 3, FIG. 5 shows a representation of the exhaust gas turbocharger of another embodiment of the invention corresponding to FIG. 2, FIG. 6 shows a representation of another embodiment of an insert part according to the invention corresponding to FIG. 4, FIG. 7 shows a cross-sectional view through a part of a turbine housing of an exhaust gas turbocharger according to the invention according to another embodiment, and FIGS. 8 and 9 show a cross-sectional view or a side representation of the insert part according to the embodiment from FIG. 7.

FIG. 1 shows an exhaust gas turbocharger 1 according to the invention, which comprises a compressor housing 2, a bearing housing 3 connected to compressor housing 2, and a turbine housing 4 connected to bearing housing 3.

A compressor wheel 13 is arranged in compressor housing 2 and fixed on one end of a rotor shaft 14. Rotor shaft 14 is mounted via a suitable bearing arrangement in bearing housing 3 and has a turbine wheel 5 on its other end, which turbine wheel is arranged in turbine housing 4.

Turbine housing 4 has a housing inlet 6, which is commonly a turbine housing inlet flange, which is, however, not visible in the figure due to the cross-sectional view selected. Correspondingly, turbine housing inlet 6 is symbolized by a wall region which is adjacent to a turbine spiral 7 which is arranged in turbine housing 4. Engine exhaust gases flow past turbine wheel 5 via turbine housing inlet 6 and turbine spiral 7 in order to set rotor shaft 14 into rotation and to thus be able to drive compressor wheel 13.

Turbine housing 4 additionally has a housing outlet 8, which may be brought into flow connection with housing inlet 6 via a wastegate arrangement 9.

Wastegate arrangement 9 has an actuator 15 (control nozzle or electric actuator) which actuates a wastegate flap or a wastegate valve via an adjusting rod 16, which wastegate flap or valve is also, like a bypass channel, arranged between housing inlet 6 and housing outlet 8; however, it is not visible in the figure.

In addition to these components, turbine housing 4 according to the invention has, according to the embodiment of FIG. 1, an insert part in the form of a wastegate spiral 10 which is arranged downstream of turbine spiral 7, when viewed in the flow direction S of the exhaust gases exiting from turbine housing 4. As explained at the beginning, this wastegate spiral 10 functions for the purpose of improving the outflow behavior of the turbine and to maintain a targeted injection of the mass flow when the wastegate arrangement is open. As explained previously, and is also the case when the insert part is in the form of a wastegate spiral, the improvement of the outflow, for example, from a catalytic converter, and a reduction of thermal losses are thereby achieved; an introduction at a greater axial orientation of the wastegate exhaust gas flow into the main exhaust gas flow of the turbine may be achieved, which introduction is deflected far enough from the downstream edge of the turbine wheel to enable an optimized flow diffusion. Further, the wastegate spiral also defines the position of the turbine state exhaust gas diffusor region and the geometry thereof. Finally, wastegate spiral 10 enables a positive influence of the type and manner in which the wastegate exhaust gas flow is mixed with the main exhaust gas flow of the turbine.

Wastegate spiral 10 may, as has likewise been already explained at the beginning, be designed as a separately producible component which is inserted into turbine housing 4 and is fixed in the same using a suitable manner.

With regard to the particularly preferred embodiment shown in the figure, wastegate spiral 10 is surrounded by heat insulation 11.

Further, an annular gap 12 is provided which, when viewed in flow direction S, connects to wastegate spiral 10 and is arranged in turbine housing outlet 8 or in the region of turbine housing outlet 8.

Annular gap 12 has a width B which is adapted to the maximum throughput of wastegate arrangement 9.

When wastegate arrangement 9 is open, in which case housing inlet 6 is in flow connection with housing outlet 8 of turbine housing 4, the wastegate mass flow, withdrawn from the main flow to turbine wheel 5 via wastegate arrangement 9, is introduced through annular gap 12 downstream of turbine wheel 5 back into the main flow via wastegate spiral 10. This results in the advantages of exhaust gas turbocharger 1 according to the invention explained in detail at the beginning.

FIGS. 2 through 4 depict a second embodiment of an exhaust gas turbocharger 1 according to the invention, which is represented in FIGS. 2 and 3 by turbine housing 4. This embodiment also has a wastegate insert part 10 which has a sleeve 18 in the embodiment according to FIGS. 3 through 4. As is particularly clear from FIG. 4, the sleeve is designed in particular as a circular cylinder and, according to FIG. 4, may be provided with grooved recesses 35 on the outer circumferential surface thereof.

Sleeve 18 has a region 22 with a reduced diameter and a region 23 which has an increased diameter and connects to the end face of the sleeve. This region 23, with an increased diameter in comparison with region 22, forms an end face collar which comprises a plurality of recesses or through openings 21. With respect to the example depicted in the figures, eight through openings of this type are provided, of which one is characterized with the reference numeral 21. With respect to the depicted embodiment, these through openings 21 are designed as ovals and form a channel which leads from the side of housing outlet 8, shown in FIG. 2, into an annulus 24 which is formed between region 22 of reduced diameter and an outlet connecting piece 17 of turbine housing 4. It is further possible to form the inner diameter of sleeve 18 as a diameter which tapers from stop 26 up to region 23 in order to optimize the diffusion.

A stop 26 is provided on the inner side in region 22 of reduced diameter, which stop is oriented towards the end face and contacts a turbine housing stop surface 27 in the assembled state, as is clarified in FIG. 2.

The provision of annulus 24 between the inner surface of connecting piece 17 and the outer surface of region 22 results in the advantage that the wastegate flow may circulate, which optimizes the discharge of the exhaust gases from wastegate opening 19, which is visible in FIG. 2. In principle, annulus 29 may have any size and shape in order to achieve this function, in particular, in order to discharge the exhaust gas flow far enough from the downstream edge of the turbine wheel in order to achieve an optimal flow diffusion.

FIGS. 5 and 6 depict another embodiment of insert part 10 according to the invention in the installed state in turbine housing 4 (FIG. 5) and in isolation in FIG. 6.

All those components which correspond to those in FIGS. 2 through 4 are designated with the same reference numerals so that reference may be made to the previous description of FIGS. 2 through 4 concerning this.

As is also the case in the embodiment from FIGS. 2 through 4, turbine housing 4 is designed with a double flow and has an outlet connecting piece 17 in which the embodiment of insert part 10 according to FIG. 6 is inserted.

As FIG. 5 illustrates, wastegate opening 19 is opened, since a wastegate flap 25 is lifted away from opening 19.

FIG. 5 additionally illustrates that annulus 24 decreases in its radial extension from stop 26 in the direction towards housing outlet 8. This means that insert part 10 has a conical sleeve 28, which, however, is not mandatory.

Instead, insert part 10 may also have a cylindrical sleeve 28, as is shown in FIG. 6. In both cases, insert part 10 is provided on its end face adjacent to housing outlet 8 with a ring or collar 29 which is connected in the exemplary case to sleeve 28 via five spacers 30, and thereby forms curved through openings 31 with sleeve 28. In the exemplary case, five through openings of this type are provided, of which one is identified with reference numeral 31.

FIGS. 7 through 9 depict an additional embodiment of an insert part 10 according to the invention, which is again arranged according to FIG. 7 in outlet connecting piece 17 of turbine housing 4. In the embodiment depicted in FIG. 7, turbine housing 4 is designed as a single flow.

An overview of FIGS. 8 and 9 illustrates that insert part 10 is again designed like a sleeve and has a stop collar 34 which surrounds sleeve 28 in an annular shape.

As FIGS. 8 and 9 illustrate, sleeve 28 is provided with through openings 33 directed radially inwardly and, as is primarily shown in FIG. 9, sleeve 28 is provided with a constriction or waist 36, which runs from stop collar 34 in the direction of an end face 35 of sleeve 28.

The shape of through openings 33 is, as is illustrated primarily in FIG. 8, designed as elongated and similar to an oval.

In addition to the preceding written disclosure of the invention, reference is explicitly made to the graphic representation of the invention in FIGS. 1 through 9 as supplemental to the disclosure.

LIST OF REFERENCE NUMERALS

1 Exhaust gas turbocharger
2 Compressor housing
3 Bearing housing
4 Turbine housing
5 Turbine wheel
6 Housing inlet
7 Turbine spiral
8 Housing outlet
9 Wastegate arrangement
10 Wastegate spiral/Wastegate insert part
11 Heat insulation
12 Annular gap
13 Compressor wheel
14 Rotor shaft
15 Actuator
16 Adjusting rod
17 Outlet connecting piece
18 Sleeve
19 Wastegate opening
20 Collar
21 Recesses/Through openings
22 Region reduced in diameter
23 Region increased in diameter
24 Annulus in connection with the recesses 21
25 Wastegate flap
26 Stop
27 Turbine housing stop surface
28 Cylindrical/Conical sleeve
29 Collar/Ring
30 Spacer
31 Curved through opening
32 Sleeve body
33 Lateral through openings
34 Stop collar
35 End face
36 Waist
S Flow direction of the exhaust gas
B Width of the annular gap

The invention claimed is:

1. An exhaust gas turbocharger (1) comprising:
a compressor housing (2),
a bearing housing (3),
a turbine housing (4) in which a turbine wheel (5) having an axis of rotation is arranged, which has a turbine housing inlet (6), which has a turbine spiral (7) connecting to the turbine housing inlet (6), which has a turbine housing outlet (8), and which has a wastegate arrangement (9), which in the open state brings the turbine housing inlet (6) into flow connection with the turbine housing outlet (8) for guiding a wastegate mass flow, wherein
a wastegate insert part (10) is arranged in the turbine housing (4) between the turbine wheel (5) and the turbine housing outlet (8) coaxial with the turbine wheel (5) axis of rotation,
the wastegate arrangement (9) when open introduces the wastegate mass flow into the wastegate insert part (10), and
the wastegate insert part (10) is open radially inwards for introducing wastegate mass flow from the wastegate insert part (10) into the turbine housing outlet (8) coaxial with the turbine wheel (5) axis of rotation.

2. The exhaust gas turbocharger according to claim 1, wherein the wastegate insert part (1) is a separately producible component which is inserted into the turbine housing (4) and fixed in the same.

3. The exhaust gas turbocharger according to claim 1, wherein the wastegate insert part (10) is a sheet metal insert part (10).

4. The exhaust gas turbocharger according to claim 1, wherein the turbine housing (4) is a cast housing.

5. The exhaust gas turbocharger according to claim 1, wherein an annular gap (12) is arranged in the region of the turbine housing outlet (8) downstream of the wastegate insert part (10) when viewed in the flow direction (S) of the exhaust gases discharging from the turbine housing (4).

6. The exhaust gas turbocharger according to claim 1, wherein the size of the wastegate insert part (10) is matched to the wastegate mass throughput.

7. The exhaust gas turbocharger according to claim 5, wherein a width (B) of the annular gap (12) is matched to the wastegate mass throughput.

8. An exhaust gas turbocharger (1) comprising:
a compressor housing (2),
a bearing housing (3),
a turbine housing (4) in which a turbine wheel (5) is arranged, which has a turbine housing inlet (6), which has a turbine spiral (7) connecting to the turbine housing inlet (6), which has a turbine housing outlet (8), and which has a wastegate arrangement (9), which in the open state brings the turbine housing inlet (6) into flow connection with the turbine housing outlet (8) for guiding a wastegate mass flow, wherein
a wastegate insert part (10) is arranged in the turbine housing (4) between the turbine wheel (5) and the turbine housing outlet (8) and the wastegate arrangement (9) when open introduces the wastegate mass flow into the wastegate insert part (10), and
the wastegate insert part (10) is a wastegate spiral open radially inwards.

9. The exhaust gas turbocharger according to claim 1, wherein the wastegate insert part (10) has a sleeve (18) which is provided with a collar (20; 29) on an end face.

10. The exhaust gas turbocharger according to claim 9, wherein the collar (20) is provided with through openings (21).

11. The exhaust gas turbocharger according to claim 10, wherein the collar (29) is connected to the sleeve (28) via spacers (30) and the through openings (31) are provided between the collar (29) and the sleeve (28).

12. The exhaust gas turbocharger according to claim 9, wherein the insert part (10) has a sleeve body (32) which has a waist and is provided with through openings (33) directed radially inwardly.

13. The exhaust gas turbocharger according to claim 12, wherein the sleeve body (32) is provided with an annular stop collar (34).

14. An exhaust gas turbocharger (1) comprising:
a compressor housing (2),
a bearing housing (3),
a turbine housing (4) in which a turbine wheel (5) having an axis of rotation is arranged,
which has a turbine housing inlet (6), which has a turbine spiral (7) connecting to the turbine housing inlet (6), which has a turbine housing outlet (8), and which has a wastegate arrangement (9), which in the open state brings the turbine housing inlet (6) into flow connection with the turbine housing outlet (8) for guiding a wastegate mass flow, wherein
a wastegate insert part (10) is arranged in the turbine housing (4) between the turbine wheel (5) and the turbine housing outlet (8) and the wastegate arrangement (9) when open introduces the wastegate mass flow into the wastegate insert part (10), and
the wastegate insert part (10) defines a wastegate spiral coaxial with the turbine wheel (5) axis of rotation and open radially inwards.

* * * * *